(12) United States Patent (10) Patent No.: US 8,714,406 B2
Miedema et al. (45) Date of Patent: May 6, 2014

(54) CONTAINER DENESTER APPARATUS

(75) Inventors: Dale Miedema, Zeeland, MI (US);
Randy Miedema, Zeeland, MI (US)

(73) Assignee: Lakewood Process Machinery,
Holland, MI (US)

( * ) Notice: Subject to any disclaimer, the term of this patent is extended or adjusted under 35 U.S.C. 154(b) by 0 days.

(21) Appl. No.: 13/429,931

(22) Filed: Mar. 26, 2012

(65) Prior Publication Data

US 2013/0248546 A1 Sep. 26, 2013

(51) Int. Cl.
*B65G 59/06* (2006.01)

(52) U.S. Cl.
USPC ............ 221/297; 221/222; 221/258; 221/277

(58) Field of Classification Search
USPC .................................. 221/297, 222, 258, 277
See application file for complete search history.

(56) References Cited

U.S. PATENT DOCUMENTS

| 1,950,382 | A | * | 3/1934 | Benson | 221/297 |
| 3,601,282 | A | * | 8/1971 | Vogel | 221/251 |
| 3,932,978 | A | * | 1/1976 | Kinney | 53/471 |
| 4,702,660 | A | * | 10/1987 | Niehaus et al. | 414/795.2 |
| 4,804,108 | A | * | 2/1989 | Ficken | 221/223 |
| 4,809,881 | A | * | 3/1989 | Becker | 221/224 |
| 5,067,308 | A | * | 11/1991 | Ward | 53/471 |
| 6,913,433 | B2 | * | 7/2005 | Riesterer et al. | 414/795.6 |

* cited by examiner

*Primary Examiner* — Michael K Collins
(74) *Attorney, Agent, or Firm* — The Watson I.P. Group, PLC; Jovan N. Jovanovic; Vladan M. Vasiljevic

(57) ABSTRACT

A container denester apparatus which overcomes, among other problems, the problems identified above. The denester apparatus positively controls the flanges of the container so as to individually denest a lowermost container from a stack of containers. The apparatus protects the container by spreading the force required to denest the container along much of the flange structure. In addition, the stack of containers above the lowermost container are retained, again along much of the flange structure of the immediately adjacent container.

9 Claims, 9 Drawing Sheets

CONTAINER DENESTER APPARATUS

BACKGROUND OF THE DISCLOSURE

1. Field of the Disclosure

The disclosure relates in general to rigid container filling, and more particularly, to a container denester apparatus which is utilized typically upstream of a filling system. While not limited thereto, typically such an apparatus is utilized in association with clamshell containers that are often utilized in association with small fruit (i.e., blueberry, blackberry, strawberry, etc.) filling equipment. The disclosure is not limited to use in association with clamshell containers, and other containers are likewise contemplated for use, such as paperboard tray type containers (generally, that have a flange or other surface on the side which can interface with components of the apparatus).

2. Background Art

The use of containers, such as clamshell containers, is known in the art. Such containers are often utilized in association with small fruit storage, distribution and sale. In addition, such containers are likewise used in association with vegetables, prepared food and small parts and pieces.

To conserve space, these containers are typically stored and shipped in a nested configuration. To utilize the containers, a container is first denested and presented to subsequent processing. Difficulties can be encountered with the providing such nested containers sequentially to subsequent processing. Among other problems, it is often difficult to separate the nested containers and it is possible to feed multiple containers at a time. The supply of multiple containers can jam the filling equipment. In still other configurations, the denesting of the containers can fail to separate containers. At best, the subsequent processing equipment can sense this and can make adjustments. In other cases, the failure to feed a container can result in the loss of some product and possible contamination of the equipment. In either case, the efficiency of the equipment becomes compromised. Additionally, it is important to provide accurate speed and timing control so that the containers are fed to downstream equipment at the proper time and in the proper sequential order with requisite timing.

In other instances, the denesting equipment can damage a container (which tends to be rather fragile in certain direction or orientations). Among other damage, the container can be dented, thereby changing the internal fillable dimensions and configuration. In other instances, the container can be cracked, cut or damaged to the point of loss of integrity of the container itself. If such damage is not detected, the feeding of the damaged container can result in the loss of product, damage to the equipment or contamination of the equipment.

SUMMARY OF THE DISCLOSURE

The disclosure is directed to a container denester apparatus which overcomes, among other problems, the problems identified above. The denester apparatus positively controls the flanges of the container so as to individually denest a lowermost container from a stack of clamshell containers. The apparatus protects the container by spreading the force required to denest the container along much of the flange structure. In addition, the stack of containers above the lowermost container are retained, again along much of the flange structure of the immediately adjacent container.

More particularly, the disclosure is directed to a container denester apparatus configured to denest a lowermost container from a stack of containers comprising a frame assembly, an indexing assembly and a drive assembly. The frame assembly having a front plate and a back plate defining a container cavity. The indexing assembly has a first indexing rod and a second indexing rod spaced apart from each other in a substantially parallel orientation on opposing sides of the container cavity. The first indexing rod has a front end coupled to the front plate and a back end coupled to the back plate.

The second indexing rod has a front end coupled to the front plate and a back end coupled to the back plate. The first and second indexing rods are both configured to rotate about an axis of rotation created by the coupling at the front plate and the back plate, and the respective axis of rotation being substantially parallel to each other. Each of the first and second indexing rods having an outer cam surface including a stack holding portion, an advancing notch portion and a retaining notch portion.

The advancing notch portion is disposed at an angle relative to the retaining notch portion, with the first and second indexing rods being positionable between a retaining configuration and a passing configuration. In a retaining configuration, the retaining notch portion of each of the first and second indexing rods are within the container cavity precluding passage of a container placed within the container cavity. In the passing configuration, the retaining notch portion of each of the first and second indexing rods is rotated out of the container cavity, while the advancing notch portion extends into the container cavity above the flange of the lowermost container, at least one of pushing the lowermost container and separating the lowermost container, with the stack holding portion precluding passage of the stack of containers therethrough. The drive assembly is coupled to each of the first and second indexing rods. Movement of the drive assembly imparts rotational movement to the indexing rods, in unison, between the retaining configuration and the passing configuration.

In a preferred embodiment, the frame assembly includes a first side guide spanning between front plate and the back plate and a second side guide spanning between the front plate and the back plate. The first side guide is positioned above and over at least a portion of the first indexing rod so as to obscure a portion of the first indexing rod from the container cavity. The second side guide is positioned above and over at least a portion of the second indexing rod so as to obscure a portion of the second indexing rod from the container cavity.

In another preferred embodiment, the first side guide includes an inner surface which is substantially coplanar with the advancing notch portion of the first indexing rod when the first indexing rod is in the retaining configuration.

In another preferred embodiment, the second side guide includes an inner surface which is substantially coplanar with the advancing notch portion of the second indexing rod when the second indexing rod is in the retaining configuration.

In yet another preferred embodiment, the advancing notch portion of the first indexing rod is disposed at a right angle with respect to the retaining notch portion.

In a preferred embodiment, the stack holding portion is arcuate in surface configuration.

In another preferred embodiment, the apparatus further includes a first pinion gear rotationally coupled to the first indexing rod, a second pinion gear rotationally coupled to the second indexing rod, and a rack gear member slidably positionable relative to the frame assembly. The rack gear has a first rack gear engaging the first pinion gear and a second rack gear engaging the second pinion gear. Slidable movement of the rack gear member rotates the first and second indexing rod between the retaining configuration and the passing configuration.

In another preferred embodiment, the apparatus further comprises an actuator coupled to the rack gear member. The actuator controllably directs the track gear member between the retaining configuration and the passing configuration.

In another preferred embodiment, the rack gear member is slidably positionable in one of a vertical direction and a horizontal direction between the retaining configuration and the passing configuration.

In another preferred embodiment, the rack gear member is slidably positionable in a horizontal direction between the retaining configuration and the passing configuration.

In another aspect of the disclosure, the disclosure is directed to a container denester apparatus configured to denest a lowermost container from a stack of containers. The apparatus includes a frame assembly and an indexing assembly. The frame assembly has a plurality of plates to define a container cavity. The indexing assembly has a first indexing rod and a second indexing rod which are spaced apart from each other. The first indexing rod and the second indexing rod rotate in opposing directions from a retaining configuration to a passing configuration. The two indexing rods include a retaining notch portion and a stack holding portion. The retaining notch portion is positioned within the container cavity to preclude passage of containers therethrough in the retaining configuration. It can be rotatably moved out of the container cavity through rotation of the first and second indexing rods, with the stack holding portion entering the container cavity at a position above the retaining notch portion to preclude passage of a container therethrough. The retaining notch portion and the stack holding portion are spaced apart so as to allow the passage of a predetermined number of containers therebetween.

In another preferred embodiment, the apparatus further comprises a drive assembly coupled to each of the first and second indexing rods. Movement of the drive assembly imparts rotational movement to the indexing rods, in unison, in opposing directions between the retaining configuration and the passing configuration.

In yet another aspect of the invention, the invention comprises a method of denesting a container from a plurality of containers comprising the steps of: providing a frame assembly having a container cavity extending therethrough; providing spaced apart indexing rods spanning opposing edges of the container cavity; rotating the indexing rods in opposing directions until a retaining notch portion of each of the indexing rods extends into the container cavity, thereby defining a retaining orientation; placing a stack of containers in a nested orientation above the frame assembly with a lowermost container of the stack of containers;
rotating the indexing rods in opposing directions, thereby directing an advancing notch and a stack holding portion of each of the indexing rods between the lowermost container and an immediately adjacent container, and directing the retaining notch portion out of the container cavity, thereby defining a passing configuration; passing the lowermost container through the container cavity; retaining the stack of containers with the stack holding portion; and rotating the indexing rods back to the retaining orientation.

In a preferred embodiment, the method further comprises the step of repeating the steps of rotating the indexing rods, passing, retaining and rotating until each of the containers has passed through the container cavity.

In another preferred embodiment, the method further comprises the steps of coupling a rack frame member to the indexing rods; linearly moving the rack frame member; and imparting rotative movement to the indexing rods.

In yet another preferred embodiment, the step of rotating the indexing rods from the retaining configuration to the passing configuration comprises a rotation through about a quarter of a rotation.

BRIEF DESCRIPTION OF THE DRAWINGS

The disclosure will now be described with reference to the drawings wherein.

DETAILED DESCRIPTION OF THE DISCLOSURE

Figure 1:
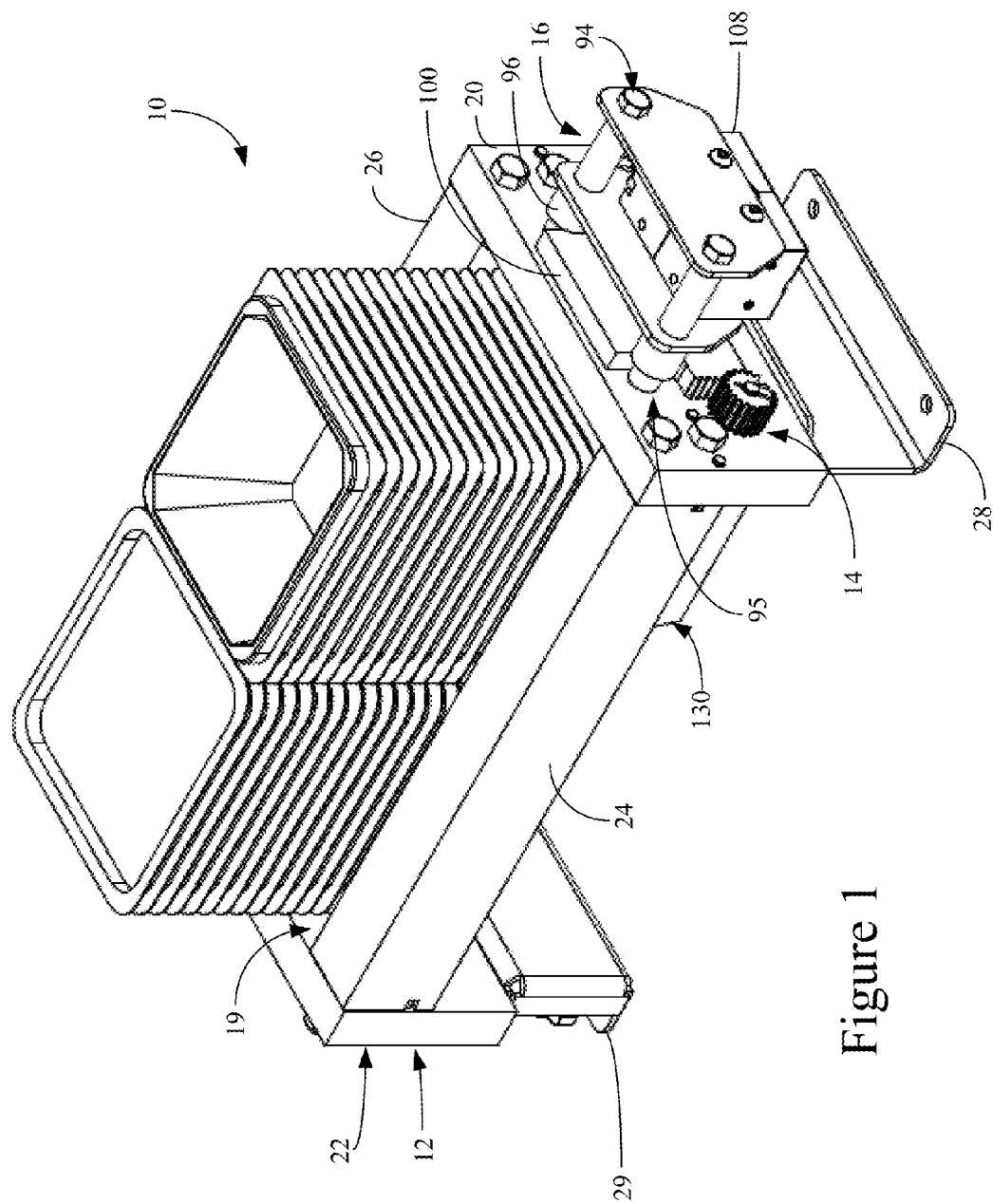
FIG. 1 of the drawings is a perspective view of the denester apparatus of the present disclosure.
Figure 2:
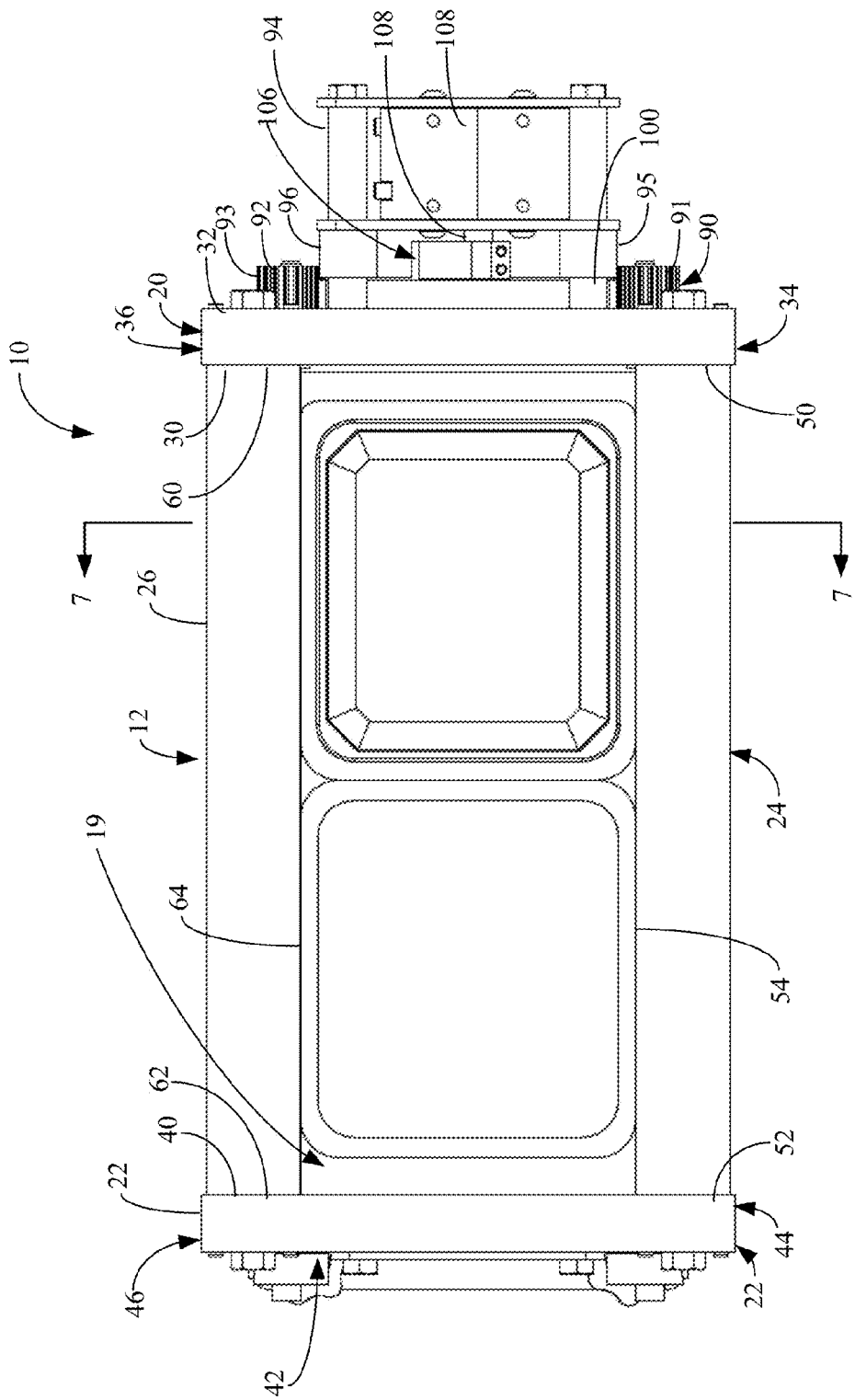
FIG. 2 of the drawings is a top plan view of the denester apparatus of the present disclosure.

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the container denester apparatus is shown generally at 10. The container denester apparatus (hereinafter referred to as the denester apparatus) is configured for supplying containers, such as clamshell container 130 sequentially to filling equipment. Among other things that are typically filled into such containers, include, but are not limited to berries, such as blueberries, raspberries, blackberries, strawberries, and the like. Of course, the same containers are utilized for other products, such as candies, nuts and the like. The invention is not limited to any particular filling equipment, or to any particular material which would be filled into the containers. Again, while clamshell containers are shown in the drawings, the disclosure is specifically not limited to clamshell containers, but can be utilized with other containers, such as paperboard tray containers, or the like (which are often covered with cellophane or other materials). As long as the container has the requisite structure to cooperate with the apparatus, it can be utilized in association with the present disclosure.

Figure 9:
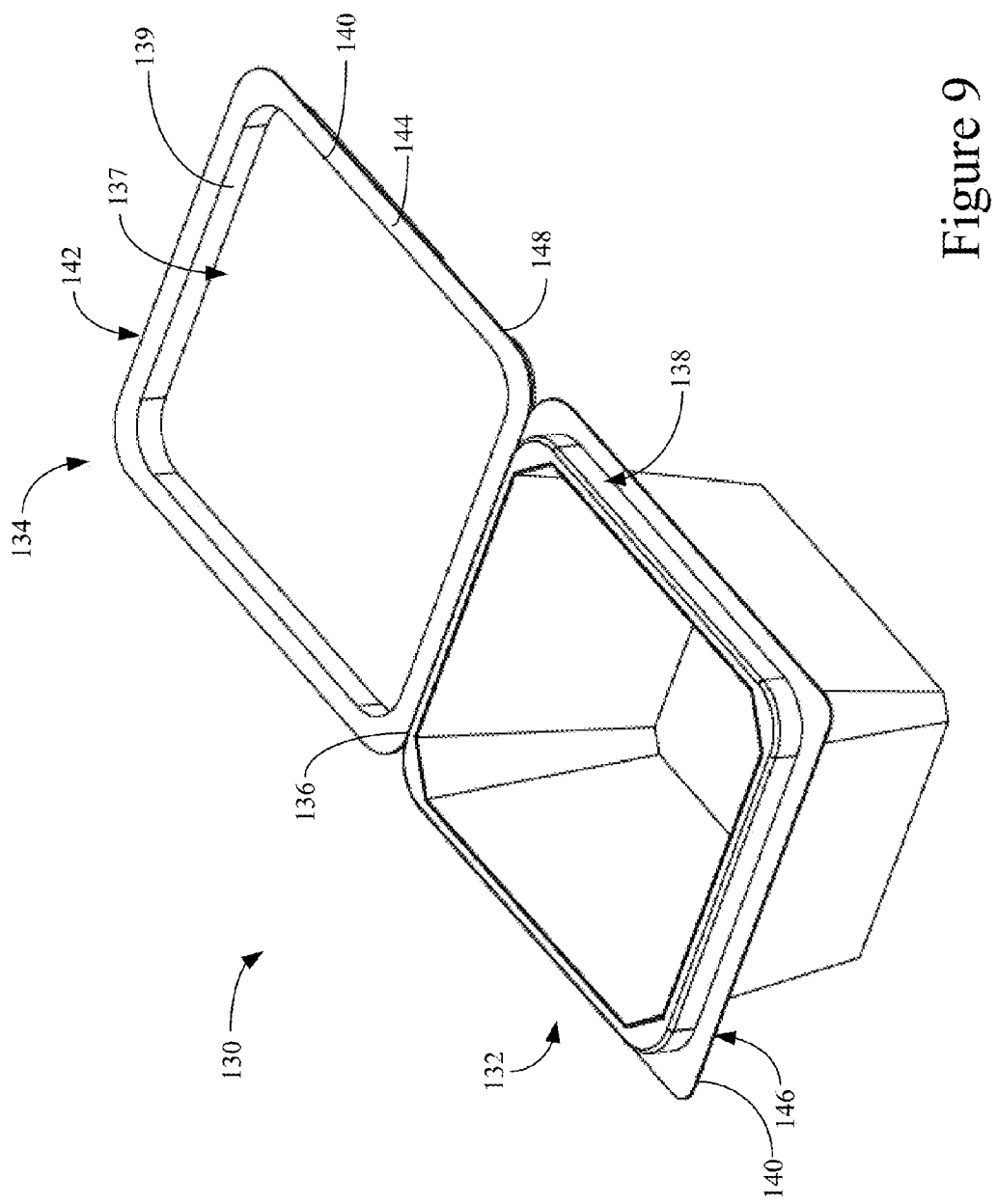
FIG. 9 of the drawings is a perspective view of an exemplary clamshell container for use in association with the container denester apparatus of the present disclosure.

A typical clamshell container 130 is shown in FIG. 9 as comprising first housing 132, second housing 134, hinge 136. Typically, the clamshell container 130 starts with the housings on either side of the hinge 136 wherein the housings are rotated about the hinge so that they overlie each other and provide a single cavity. An attachment structure 137 is typically provided that locks the first housing to the second housing. In the embodiment shown, the attachment structure comprises a raised ridge 138 on one of the housings and a recessed mating portion 139 which engage and are held through an interference fit or a snap fit.

A flange 140 extends about substantially the entirety of the outer perimeter of the clamshell container, and includes first housing flange portion 140 and second housing flange portion 142. The flanges actually form the basis from which the hinge 136 is formed. The flange 140 includes upper surface 144, lower surface 146. The upper and lower surfaces together define the outward edge 148. The denester apparatus cooperates with the flange 140 to supply the clamshell containers, sequentially, and in an indexed fashion to filling equipment (not shown). Other containers may have different cavities, or a single cavity, and may include different flange structures, provided that the flange structures can cooperate with the apparatus.

The denester apparatus 10 is shown in greater detail in FIG. 1 as comprising frame assembly 12, indexing assembly 14 and drive assembly 16. With specific reference to FIG. 1, the frame assembly 12 is shown as comprising front plate 20, back plate 22, first side guide 24 and second side guide 26. These elements are coupled together to form the frame structure. The frame assembly 12 can be coupled to brackets 28, 29 which are coupled to the front plate 20 and the back plate 22, respectively. The brackets 28, 29 are coupled to filling equipment in a proper orientation so that the individual containers that are supplied by the equipment can be sequentially delivered where needed on the filling equipment.

With continued reference to the Frame assembly 12, the front plate 20 includes inner surface 30, outer surface 32, first side 34, second side 36, first rod opening 38 and second rod opening 39. The inner surface 30 is opposite the outer surface 32 and defines a thickness of the front plate. In the embodiment shown, the front plate is substantially planar and substantially rectangular in configuration. It is preferred that the front plate comprises a metal member, although a number of other suitable materials are likewise contemplated for use.

Figure 3:
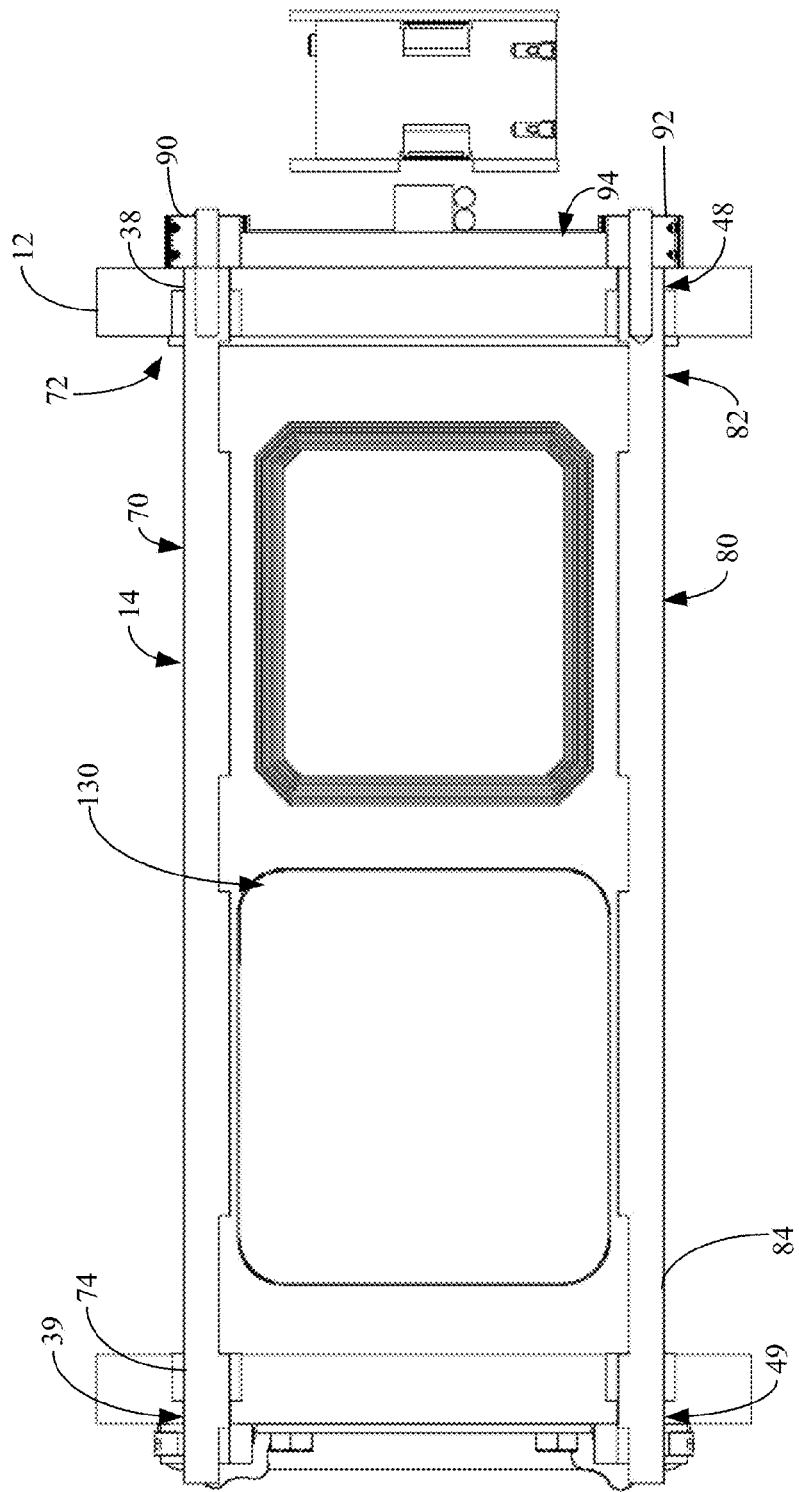
FIG. 3 of the drawings is a bottom cross-sectional view of the denester apparatus of the present disclosure taken generally about lines 3-3 of FIG. 5.
Figure 4:
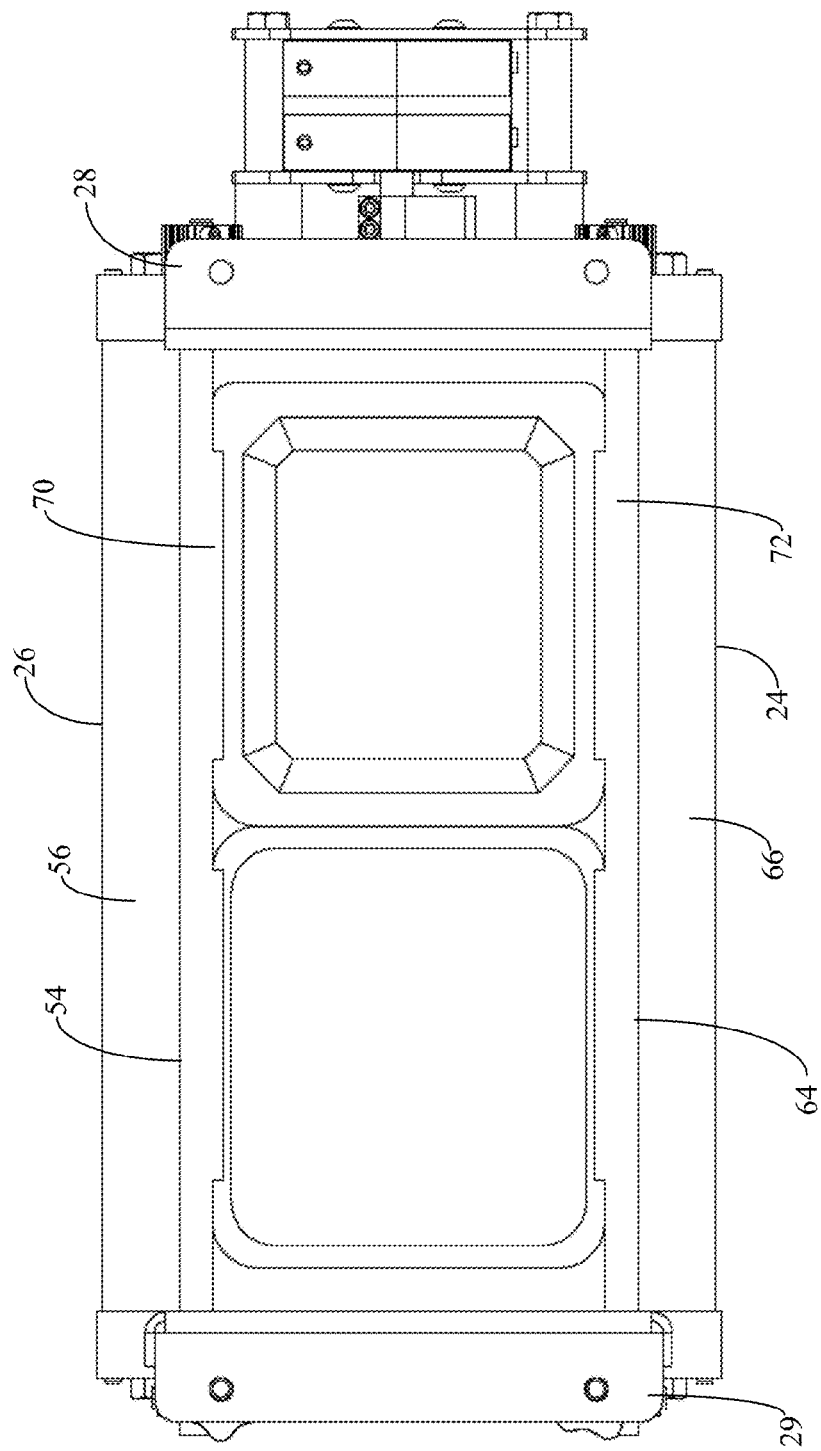
FIG. 4 of the drawings is a bottom plan view of the denester apparatus of the present disclosure.

The first rod opening 38 is shown in FIG. 3 and the second rod opening 39 is also shown in FIG. 3 as being spaced apart from each other a predetermined distance. In the embodiment shown, the distance of the openings is such that when the indexing rods are inserted through the openings, they are in the proper orientation. In the embodiment shown, the two openings position the two rods in a substantially parallel orientation. In addition the two openings are substantially perpendicular to both the inner and outer surfaces 30, 32 so that the indexing rod will be substantially perpendicular to the inner surface 30 of the front plate.

The back plate 22 is a substantially identical mirror image of the front plate 20. The back plate 22 includes inner surface 40, outer surface 42, first side 44, second side 46, first rod opening 48 and second rod opening 49. The inner surface 40 is opposite the outer surface 42 and defines a thickness of the back plate. As with the front plate, the back plate is substantially planar and substantially rectangular in configuration. It is preferred that the back plate comprises a metal member, although a number of other suitable materials are likewise contemplated for use.

The first rod opening 48 and the second rod opening 49 correspond to the first rod opening 38 and the second rod opening 39 so that the first indexing rod 70 and the second indexing rod 80 can span between the two so as to be substantially perpendicular to the two plates.

The first side guide 24 spans between the front plate 20 and the back plate 22. The first side guide includes front end 50 coupled to the front plate 20 through suitable fasteners, and back end 52 coupled to the back plate 22 through suitable fasteners. The first side guide 24 further includes inner surface 54 and lower surface 56. The inner surface 54 is substantially planar and extends substantially perpendicular to the inner surfaces 30, 40 of the first and second plates.

The second side guide 26 spans between the front plate 20 and the back plate 22 in a spaced apart orientation from the first side guide 24. The first side guide 24 and the second side guide 26 are substantial mirror images of each other taken about an axis that bisects the front and back plates. The second guide likewise includes front end 60 coupled to the front plate through suitable fasteners, and back end 62 coupled to the back plate 22 through suitable fasteners. The second side guide 26 further includes inner surface 64 and lower surface 66.

The inner surface 54 of the first side guide and the inner surface 64 of the second side guide are substantially parallel to each other and face each other in a spaced apart orientation. The front plate 20, back plate 22, first side guide 24 and second side guide 26 define the container cavity, with the first side guide and the second side guide defining the width of the container and the front and back plates defining the length thereof. To facilitate the movement of the containers, it is preferred that the inner surface 54, the inner surface 64 and the inner surfaces 30 and 40 are substantially planar and free of surface aberrations which can lead to undesired interference with the containers.

It will be understood that the positioning of the first and second rod openings 38, 48, 39, 49 are configured so that the resulting first and second indexing rod is positioned in a desired orientation relative to the inner surfaces 54, 64 of the first and second side guides 24, 26.

More particularly, the indexing assembly includes first indexing rod 70 and second indexing rod 80. The first indexing rod spans between the first rod opening 38 (which forms a bearing surface, and which may include bearing or the like) and the first rod opening 48 (which likewise forms a bearing surface, and which may include a bearing or the like). The first indexing rod 70 includes front end 72 and back end 74. The front end 72 interfaces with the first rod opening 38 of the front plate 20. The back end 74 interfaces with the first rod opening 48 of the back plate 22. In turn, the first rod openings 38, 48 provide an axis of rotation for the first indexing rod 70.

The first indexing rod 70 further includes outer cam surface 76 which includes a stack holding portion 77, an advancing notch portion 78 and a retaining notch portion 79. As will be explained, the stack holding portion 77 retains the stack of containers from passing through the container cavity. The advancing notch portion 78 and the retaining notch portion 79 facilitate the passage of a single container through the cavity as desired.

Figure 7:
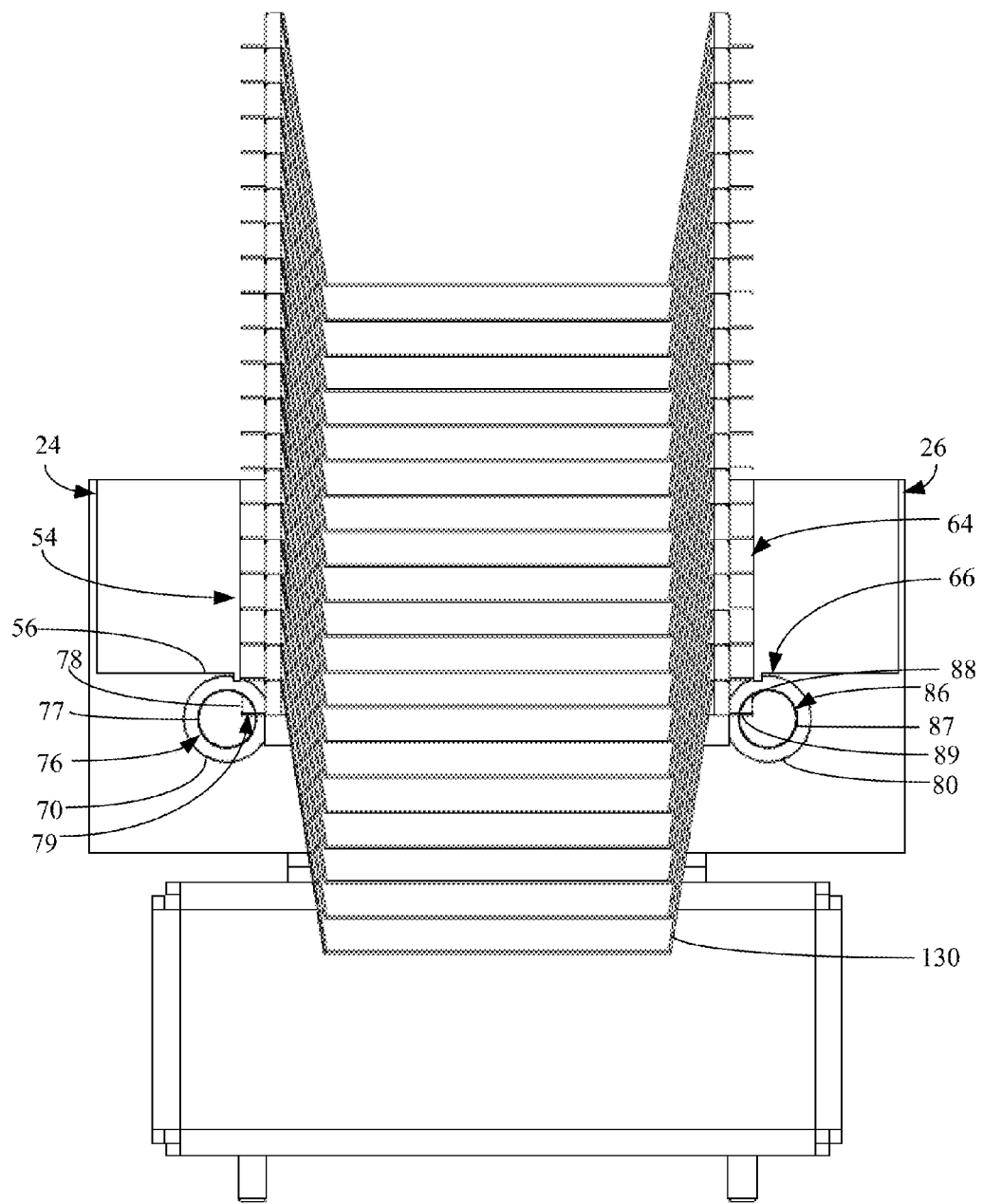
FIG. 7 of the drawings is a cross-sectional view of the denester apparatus of the present disclosure taken generally about lines 7-7 of FIG. 2.
Figure 8:
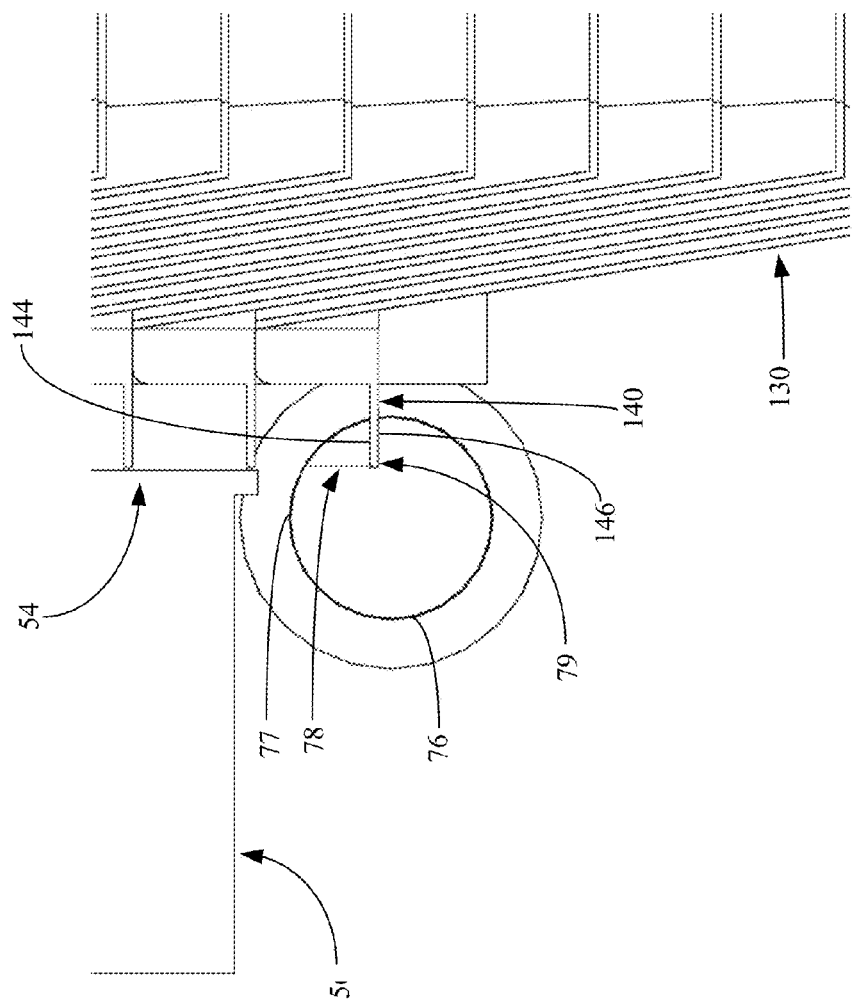
FIG. 8 of the drawings is a partial cross-sectional view of the denester apparatus of the present disclosure taken generally about lines 7-7 of FIG. 2.

More particularly, and with particular reference to FIG. 7, it will be understood that the first indexing rod 70 is positioned below the lower surface 56 of the first side guide so that when first indexing rod is rotated so that the advancing notch portion 78 is substantially vertical, it is substantially co-planar with the inner surface 54 of the first side guide 24. Additionally, the first indexing rod 70 is spaced apart from the lower surface such that, when the retaining notch portion 79 is substantially horizontal (and the advancing notch portion 78 is substantially vertical), the distance between the lower end of the inner surface 54 and the retaining notch portion 79 substantially corresponds to the distance between two nested containers. In turn, as the flange 140 of the bottom-most container is resting on the retaining notch portion 79, the flange of the subsequent container is contacting the inner surface 54 of the first side guide at or near the bottom thereof.

The second indexing rod 80 is a substantially identical mirror image of the first indexing rod 70 and includes front end 82 and back end 84. The front end 82 interfaces with the second rod opening 39 of the front plate 20. The back end 84 interfaces with the second rod opening 49 of the back plate 22. In turn, the second rod openings 39, 49 provide an axis of rotation for the second indexing rod 80.

The second indexing rod 80 further includes outer cam surface 86 which includes a stack holding portion 87, an advancing notch portion 88 and a retaining notch portion 89. As will be explained, the stack holding portion 87 retains the stack of containers from passing through the container cavity. The advancing notch portion 88 and the retaining notch portion 89 facilitate the passage of a single container through the cavity as desired.

More particularly, and with particular reference to FIG. 5, it will be understood that the second indexing rod 80 is positioned below the lower surface 66 of the second side guide so that when first indexing rod is rotated so that the advancing notch portion 88 is substantially vertical, it is substantially co-planar with the inner surface 64 of the second side guide 26. Additionally, the second indexing rod 80 is spaced apart from the lower surface such that, when the retaining notch portion 89 is substantially horizontal (and the advancing notch portion 88 is substantially vertical), the distance between the lower end of the inner surface 64 and the retaining notch portion 89 substantially corresponds to the distance between two nested containers. In turn, as the flange 140 of the bottom-most container is resting on the retaining notch portion 89, the flange of the subsequent container is contacting the inner surface 64 of the second side guide at or near the bottom thereof.

It is contemplated that the outer cam surfaces 76, 86 of the first and second indexing rod, respectively, can be varied in shape and configuration. Essentially, the rotation of the cam proceeds from a retaining configuration to a passing configuration wherein the retaining configuration retains the stack of containers, and wherein the passing configuration sequentially releases a single container through the apparatus and onto subsequent processing (i.e., filling), while retaining the remaining containers thereabove. It is advantageous that the outer cam surfaces of the first and second indexing rod cooperate/contact much of the flange structure, which is disposed on the side of the first and second housings so as to spread the force therealong. Such a configuration limits the possibility of damage to the container.

Figure 5:
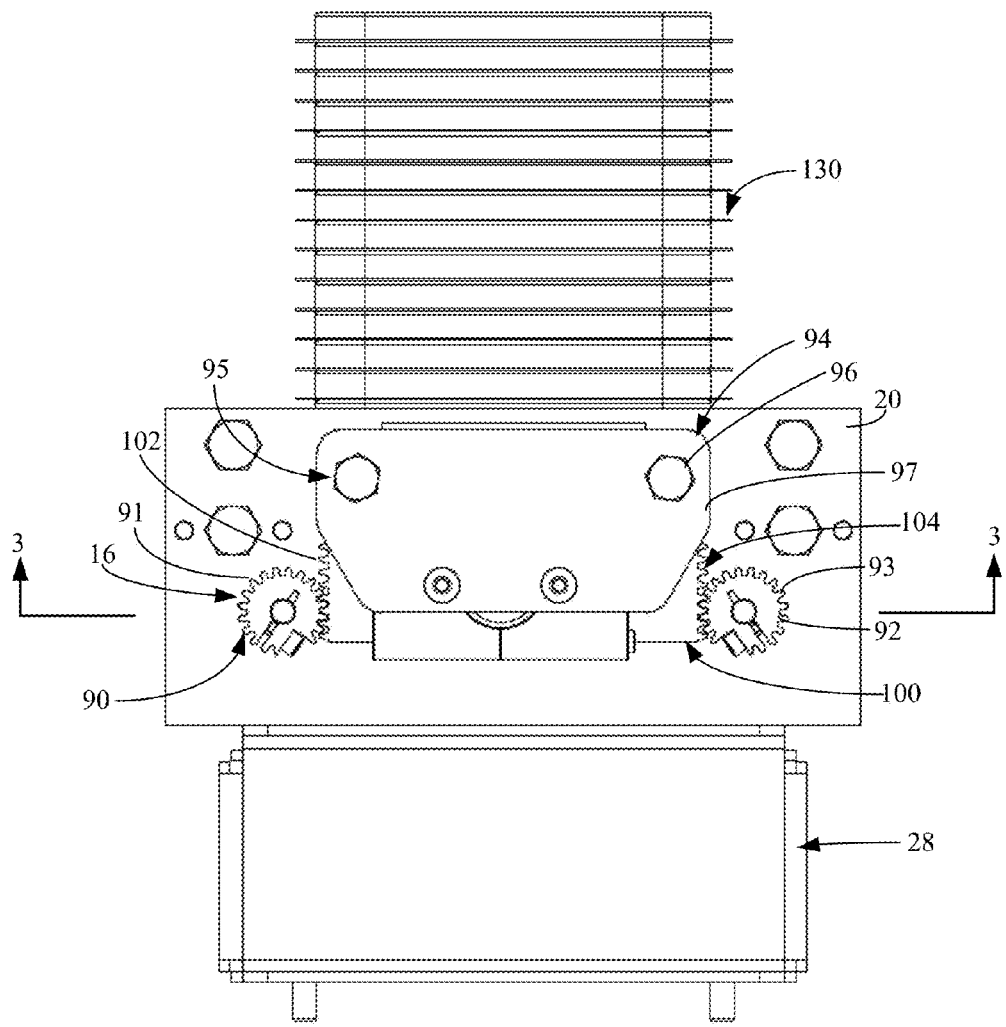
FIG. 5 of the drawings is a front elevational view of the denester apparatus of the present disclosure.
Figure 6:
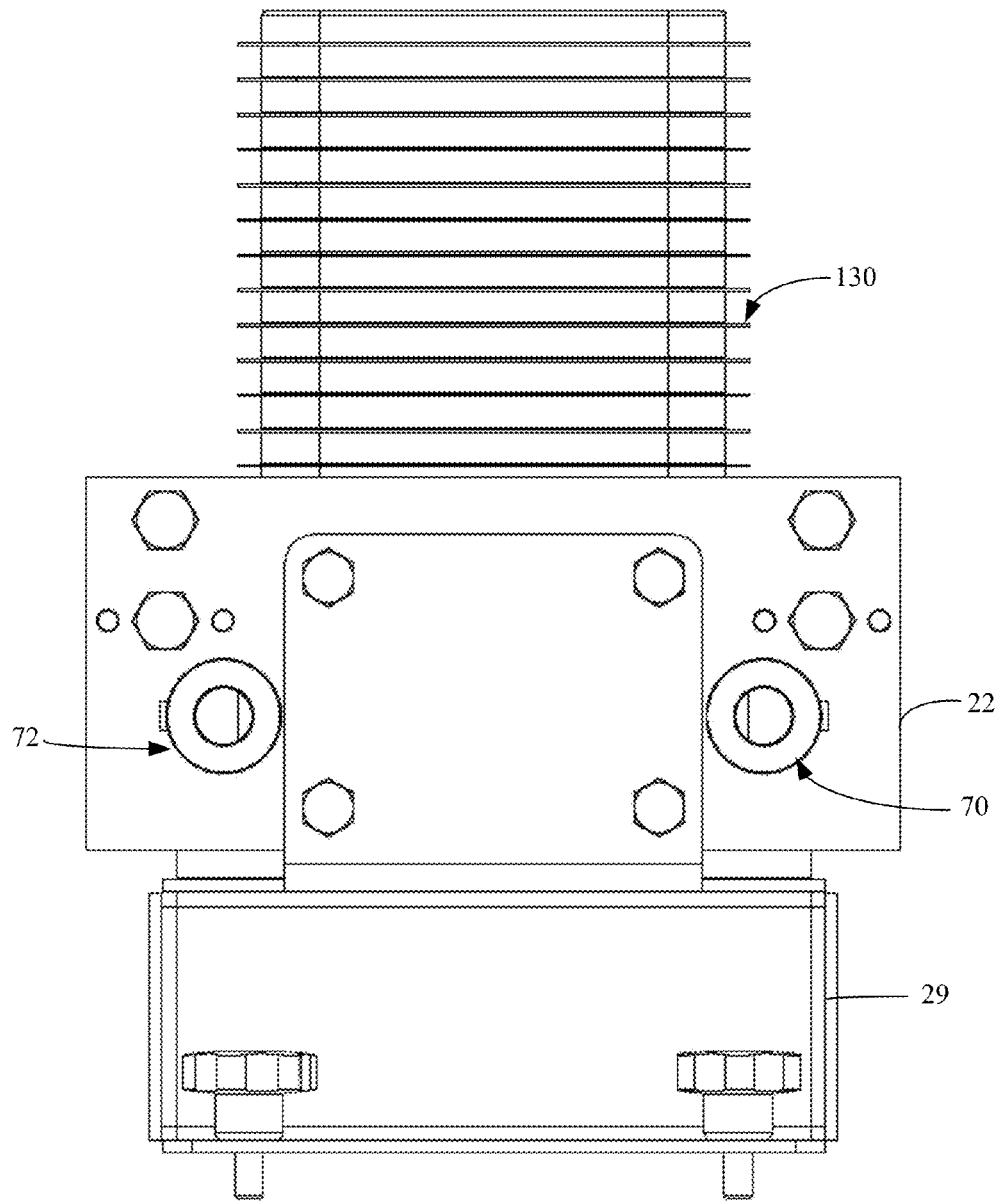
FIG. 6 of the drawings is a back elevational view of the denester apparatus of the present disclosure.

The drive assembly 16 is shown in FIG. 5 as comprising first pinion gear 90, second pinion gear 92, rack frame member 94, rack gear member 100 and rack actuator 108. The first pinion gear 90 is coupled to the front end 72 of the first indexing rod 70, and includes a plurality of teeth 91. The second pinion gear 92 is coupled to the front end 82 of the second indexing rod 80 and includes a plurality of teeth 93. It will be understood that inasmuch as the two indexing rods are substantially mirror images of each other, the first and second pinion gears are substantially identical in configuration. It will also be understood that as the indexing rods do not rotate through an entire revolution, the teeth 91, 93 also extend only through the operable range of rotation. It will also be understood that while a particular gear configuration is shown, any number of different gears are contemplated for use.

The rack frame member 94 extends between the first and second gears 90, 92 and includes rack guides 95, 96 and actuator support member 97. The rack guides 95, 96 extend outwardly from the front plate 20. The actuator support member 97 is coupled to the rack guides and spaced apart from the front plate 20, but generally parallel thereto. The rack frame member 94 provides the framework upon which the rack gear member 100 and the rack actuator 108 are supported, for interaction with the first and second pinion gears 90, 92.

The rack gear member 100 includes first rack gear 102, second rack gear 104 and actuator coupling 106. The first rack gear 102 interfaces with the first pinion gear 90 and includes a mating set of teeth. The second rack gear 104 is positioned on the opposite side of the first rack gear 102 and interfaces with the second pinion gear 92. Additionally, the track gear member 100 is permitted to move linearly (in this case vertically in an upward and downward motion), and constrained to such movement by the rack guides 95, 96.

The rack actuator 108 is coupled to the actuator support member 97 of the rack frame member 94. The rack actuator 108 includes track coupling 110 which is coupled to the actuator coupling 106 of the rack gear member 100. The rack actuator may comprise any number of different assemblies, including, but not limited to hydraulic cylinders, air cylinders, solenoids, motors, and the like. The rack actuator 108 moves the rack gear member 100 between a first upper position and a second lower position. In the upper position, the first and second indexing rods 70 and 80 are in a position which precludes passage of the containers. In the lower position, the first and second indexing rods 70 and 80 have in an indexed fashion allowed the passage of a single container from the stack of containers through the cavity to subsequent processing (i.e., filling and the like).

It is likewise contemplated that different actuator and rack gear members are can be used. For example, a gear train may be employed which utilizes a central gear member that transfers motion to a pair of racks, each rack is coupled to one of the first and second pinion gears. In turn, the linear movement of the pair of racks transfers to rotational movement of the first and second indexing rod. The two racks may move horizontally, vertically or disposed obliquely. There are a number of different configurations for triggering the rotational movement (in some type of synchronization) of the first and second indexing rods to effectuate the indexing of a single container through the container cavity.

In operation, the denester apparatus 10 is coupled to another device which utilizes containers, such as filling equipment. The apparatus 10 is positioned in an orientation wherein it is capable of sequentially supplying containers to the equipment located further downstream.

Next, the user actuates the rack actuator 108 so that it is in a first position which precludes the passage of containers. In such a configuration, each of the retaining notch portions 79, 89 of the first and second indexing rods are substantially horizontal in orientation. The containers are then supplied to the apparatus 10 so that they are nested into one another. The flange 140 of the lowermost container 130 is resting against each of the retaining notch portion 79 and the retaining notch portion 89 of the respective indexing rods 70, 80.

Different units are configured to retain differing amounts of containers nested upon each other. In some embodiments, the apparatus may be coupled to a supply assembly which is configured to supply stacks of nested containers to the apparatus, so as to make the flow substantially continuous and perpetual.

As the containers are needed, the rack actuator 108 is triggered which, through rack coupling 110, supplies motive force to the actuator coupling 106 to move the rack gear member 100. In the embodiment shown, the rack gear member moves linearly in an up and down direction. It will be understood that in other embodiments, the rack gear member moves linearly in a side to side orientation.

In this instance, the rack gear member is initially in an uppermost orientation. In the uppermost orientation, the first and second indexing rods are in the retaining configuration (i.e., with the stack of containers being retained by the retaining notch portions 79, 89 of the cam surfaces of the first and second indexing rod, respectively). As the actuator coupling supplies force, the rack gear member is moved downward toward and into a lowermost orientation.

Proceeding from the uppermost to the lowermost configuration directs the first and second rack gears to interface with the first and second pinion gears 90, 92 coupled to the first and second indexing rod 70, 80, and to rotate the same inwardly. The inward rotation of the first and second indexing rod directs the advancing notch portion to be directed between the flange of the lowermost container and the immediately adjacent container. At the same time, the retaining notch portion 79 is moving out of the way and away from contact with the flange of the lowermost container. As the advancing notch portion enters the container cavity, the retaining notch portion is exiting the container cavity.

Continued inward rotation of the two indexing rods results in the advancing notch portion pushing the flange of the lowermost container in a downward direction, with the stack holding portion 77 fully between the flange of the lowermost container, and the immediately adjacent container (thereby retaining the stack of containers, and precluding downward movement of the same). At the same time, the retaining notch portion 79 is completely out of the path of travel of the container. In turn, the single lowermost container proceeds through the container cavity, falls out of the denester apparatus and proceeds to downstream processing (i.e., filling and the like).

At some point after the retaining notch portion 79 is beyond the downward path of the container, the first and second indexing rods have reached the passing configuration. As the passing configuration is reached, the rack frame member reaches the lowermost position of travel. To be in a position to dispense the now lowermost container necessitates that the first and second indexing rods return to the retaining configuration. This is accomplished by, through the actuator, directing the rack gear member to the uppermost position, and rotating the first and second indexing rods outwardly.

As the rotation proceeds, eventually, the stack holding portion of the outer cam surfaces of the indexing rods moves out of the way of the flange of the lowermost container. At that time, the stack of containers move downwardly, and the lowermost flange contacts the retaining notch portion of the first and second indexing rods. This precludes the containers from moving, and returns the indexing rods to their original position. At the same time, the rack gear member has reached the lowermost position. The cycle is now ready to repeat itself, to, in an indexed fashion, dispense a subsequent container to subsequent processing.

It is contemplated that the speed of the apparatus can be varied from a few containers a minute to dozens of containers per minute. In addition, there is no reasonable limitation as to the size of the containers. The configuration shown contemplates containers that are substantially symmetrical and which have a length and a width which is less than a foot in any direction. Of course, substantially larger, as well as smaller containers, symmetrical or asymmetrical are contemplated for use within the apparatus. Such containers may not comprise clamshell containers, but may comprise tray type containers that are configured with the appropriate structure to cooperatingly operate in conjunction with the apparatus. In addition, it will be contemplated that other profiles for the indexing assembly, as well as other manners in which to drive the indexing rods are contemplated for use.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A container denester apparatus configured to denest a lowermost container from a stack of containers, each of the containers including a flange extending about at least a portion of either side of the container, the apparatus comprising:

a frame assembly having a front plate and a back plate defining a container cavity;

an indexing assembly having a first indexing rod and a second indexing rod spaced apart from each other in a substantially parallel orientation on opposing sides of the container cavity, the first indexing rod having a front end coupled to the front plate and a back end coupled to the back plate, the second indexing rod having a front end coupled to the front plate and a back end coupled to the back plate, the first and second indexing rods both configured to rotate about an axis of rotation created by the coupling at the front plate and the back plate, and the respective axis of rotation being substantially parallel to each other, each of the first and second indexing rods having an outer cam surface including a stack holding portion, an advancing notch portion and a retaining notch portion, the advancing notch portion being disposed at an angle relative to the retaining notch portion, with the first and second indexing rods being positionable between a retaining configuration and a passing configuration, wherein in a retaining configuration the retaining notch portion of each of the first and second indexing rods are within the container cavity precluding passage of a container placed within the container cavity, to a passing configuration, wherein the retaining notch portion of each of the first and second indexing rods is rotated out of the container cavity, while the advancing notch portion extends into the container cavity above the flange of the lowermost container, at least one of pushing the lowermost container and separating the lowermost container, with the stack holding portion precluding passage of the stack of containers therethrough;

a drive assembly coupled to each of the first and second indexing rods, wherein movement of the drive assembly imparts rotational movement to the indexing rods, in unison, between the retaining configuration and the passing configuration; and a first pinion gear rotationally coupled to the first indexing rod, a second pinion gear rotationally coupled to the second indexing rod, and a rack gear member slidably positionable relative to the frame assembly, the rack gear having a first rack gear engaging the first pinion gear and a second rack gear engaging the second pinion gear, wherein slidable movement of the rack gear member rotates the first and second indexing rod between the retaining configuration and the passing configuration.

2. The container denester apparatus of claim 1 wherein the frame assembly includes a first side guide spanning between front plate and the back plate and a second side guide spanning between the front plate and the back plate, the first side guide being positioned above and over at least a portion of the first indexing rod so as to obscure a portion of the first indexing rod from the container cavity, the second side guide being positioned above and over at least a portion of the second indexing rod so as to obscure a portion of the second indexing rod from the container cavity.

3. The container denester apparatus of claim 2 wherein the first side guide includes an inner surface which is substantially coplanar with the advancing notch portion of the first indexing rod when the first indexing rod is in the retaining configuration.

4. The container denester apparatus of claim 3 wherein the second side guide includes an inner surface which is substantially coplanar with the advancing notch portion of the second indexing rod when the second indexing rod is in the retaining configuration.

5. The container denester apparatus of claim 4 wherein the advancing notch portion of the first indexing rod is disposed at a right angle with respect to the retaining notch portion.

6. The container denester apparatus of claim 5 wherein the stack holding portion is arcuate in surface configuration.

7. The container denester apparatus of claim 1 further comprising an actuator coupled to the rack gear member, the actuator controllably directing the rack gear member between the retaining configuration and the passing configuration.

8. The container denester apparatus of claim 7 wherein the rack gear member is slidably positionable in one of a vertical direction and a horizontal direction between the retaining configuration and the passing configuration.

9. The container denester apparatus of claim 8 wherein the rack gear member is slidably positionable in a horizontal direction between the retaining configuration and the passing configuration.

* * * * *